United States Patent [19]

Yoshida et al.

[11] Patent Number: 4,891,598

[45] Date of Patent: Jan. 2, 1990

[54] VARIABLE BIT RATE CLOCK RECOVERY CIRCUIT

[75] Inventors: Shousei Yoshida; Susumu Otani, both of Tokyo, Japan

[73] Assignee: NEC Corporation, Tokyo, Japan

[21] Appl. No.: 241,669

[22] Filed: Sep. 8, 1988

[30] Foreign Application Priority Data

Sep. 9, 1987 [JP] Japan ................. 62-224148

[51] Int. Cl.[4] .............................. H03L 7/00
[52] U.S. Cl. ...................... 328/61; 328/63; 328/155; 375/110; 375/119; 331/18; 307/269
[58] Field of Search .............. 328/61, 63, 137, 155; 375/119, 110; 307/269; 331/18

[56] References Cited

U.S. PATENT DOCUMENTS

| 4,280,099 | 7/1981 | Rattlingourd | 328/63 |
| 4,590,445 | 5/1986 | Tabourier et al. | 328/61 |
| 4,631,484 | 12/1986 | Malka et al. | 328/63 |
| 4,694,196 | 9/1987 | Hasley et al. | 307/269 |
| 4,707,842 | 11/1987 | Fischer | 375/110 |

Primary Examiner—John S. Heyman
Attorney, Agent, or Firm—Sughrue, Mion, Zinn, Macpeak & Seas

[57] ABSTRACT

In a variable bit rate clock recovery circuit, a phase difference between an input demodulated signal and a recovered clock signal is detected, the detected phase difference signal is filtered by a loop filter and is then integrated, the integrated signal is supplied as an address to first and second ROMs, which store data of cosine and sine waves in advance, output data from the first and second ROMs are respectively D/A-converted by first and second D/A converters, an output signal from a variable frequency generator is modulated by using an output from the first D/A converter, a signal obtained by shifting the output signal from the variable frequency signal generator by $\pi/2$ radians is modulated by an output from the second D/A converter, and the respective modulated signals are synthesized, thereby obtaining a reference clock signal.

2 Claims, 4 Drawing Sheets

VARIABLE BIT RATE CLOCK RECOVERY CIRCUIT

BACKGROUND OF THE INVENTION

The present invention relates to a clock recovery circuit for recovering a reference clock signal from a digitally modulated signal and, more particularly, to a variable bit rate clock recovery circuit required for a data communication system with a variable bit rate.

Various circuits for recovering a reference clock signal from a digitally modulated signal have been proposed. FIG. 1 shows one of such conventional circuits. Referring to FIG. 1, a clock phase error detector 1, a loop filter 2, a D/A converter 3, and a voltage controlled oscillator (VCO) 4 constitute a clock recovery closed loop. The VCO 4 outputs a reference clock signal CLK. The clock phase error detector 1 receives a demodulated signal $S_{DEM}$ and the reference clock signal CLK, detects a phase difference between the two signals, and outputs the phase difference as a digitized time serial signal $S_{ER}$. FIG. 2 shows an arrangement of the clock phase error detector 1. Referring to FIG. 2, the demodulated signal $S_{DEM}$ is supplied to an A/D converter 6. The reference clock signal CLK is supplied to a frequency multiplier 5, a phase error detector 7, and a zero-cross detector 8.

The frequency multiplier 5 supplies a sampling signal having a frequency twice that of the reference clock signal CLK to the A/D converter 6. The A/D converter 6 A/D-converts the demodulated signal $S_{DEM}$ by using the sampling signal. The digital output signal from the A/D converter 6 is input to the phase error detector 7 and the zero-cross detector 8. The phase error detector 7 selects an odd-numbered sampling signal, i.e., the sampled value at a zero-cross point of the demodulated signal $S_{DEM}$. The zero-cross detector 8 selects an even-numbered sampling signal, i.e., the sampled value at a signal point of the demodulated signal $S_{DEM}$, and outputs a signal representing the polarity of the selected signal to the phase error detector 7.

The phase error detector 7 multiplies the sampled value at the zero-cross point of the detected demodulated signal by the polarity of the sampled value at the signal point of the demodulated signal detected by the zero-cross detector 8, and obtains a phase error. The output from the phase error detector 7 represents a correct phase error only when the polarity is inverted at a signal point before or after the phase error detection point of the demodulated signal $S_{DEM}$, i.e., at the zero-cross point. Therefore, when the zero-cross detector 8 detects that the polarity is inverted at a signal point before or after the phase error detection point of the demodulated signal $S_{DEM}$, it outputs a zero-cross detection pulse to a selector 9. The selector 9 selects an output from the phase error detector 7 by using this zero-cross detection pulse. When the zero-cross pulse is not supplied, the selector 9 outputs a zero or outputs a value in the immediately preceding sampling period again. The outputs from the selector 9 become clock phase error signals $S_{ER}$. When the timings of the demodulated signal $S_{DEM}$ and the reference clock signal CLK coincide with each other, the mean value of the clock phase error signals $S_{ER}$ converges to zero.

Referring to FIG. 1, an output from the clock phase error detector 1 is input to the loop filter 2. Then, high-frequency components are removed from the output in accordance with the low-pass filter characteristics of the loop filter 2. This loop filter 2 is generally constituted by an infinite impulse response digital filter and is an important factor determining a noise bandwidth and synchronization characteristics of the clock recovery closed loop. In addition, by simply replacing the loop filter 2 with multiplication of DC gain K, a primary type loop can be formed.

The digital time serial signal as the output from the loop filter 2 is converted into an analog signal by the D/A converter 3. The output frequency and phase of the voltage controlled oscillator 4 are controlled by the output voltage from the D/A converter 13, and the output from the voltage controlled oscillator 4 becomes the reference clock signal CLK.

In the above conventional reference clock recovery circuit, no specific problem is posed as long as a bit rate is fixed. However, various bit rates are employed in a small-capacity SCPC system such as a commercial communication, which is expected to be developed further in the future. Thus, it is desired that such system can flexibly respond to a changing/switching operation of these bit rates. From this viewpoint, the following problems are posed in the conventional reference clock recovery circuit.

(1) The VCO 4 (FIG. 2) must be replaced with another one every time a bit rate is changed. Therefore, a number of VCOs 4 corresponding to the number of types of bit rates must be prepared.

(2) It is impossible for all the VCOs 4 corresponding to the number of types of bit rates to have identical voltage control characteristics and frequency modulation characteristics. Therefore, a great modification of peripheral circuits is inevitably required in accordance with a VCO used every time a bit rate is changed.

(3) Cumbersome adjustment due to a change in bit rate is required for each replacement of the VCO 4.

SUMMARY OF THE INVENTION

It is an object of the present invention to provide a variable bit rate clock recovery circuit capable of responding to various bit rates.

According to the present invention, there is provided a variable bit rate clock recovery circuit comprising: a clock phase error detector for receiving a demodulated signal of a digitally modulated signal and a reference clock signal, detecting a phase error between the input signals, and outputting a clock phase error signal; a loop filter for removing a high-frequency component from the clock phase error signal; an integrator for integrating an output signal from the loop filter; first and second ROMs for storing data of cosine and sine waves in a digital form in advance, the first and second ROMs being accessed by an output from the integrator; first and second D/A converters for respectively converting output digital signals from the first and second ROMs into analog signals; a variable frequency signal generator, controlled by a frequency control signal, for generating signals having various frequencies; a phase shifter for shifting a phase of each signal from the variable frequency signal generator by $\pi/2$ radians; a first multiplier for modulating each output from the variable frequency signal generator by using an output signal from the first D/A converter; a second multiplier for modulating an output from the phase shifter by using an output signal from the second D/A converter; and a synthesizer for adding outputs from the first and second multipliers together and outputting the reference clock signal.

DETAILED DESCRIPTION OF THE PREFERRED EMBODIMENTS

An embodiment of the present invention will be described below with reference to the accompanying drawings.

Figure 3:
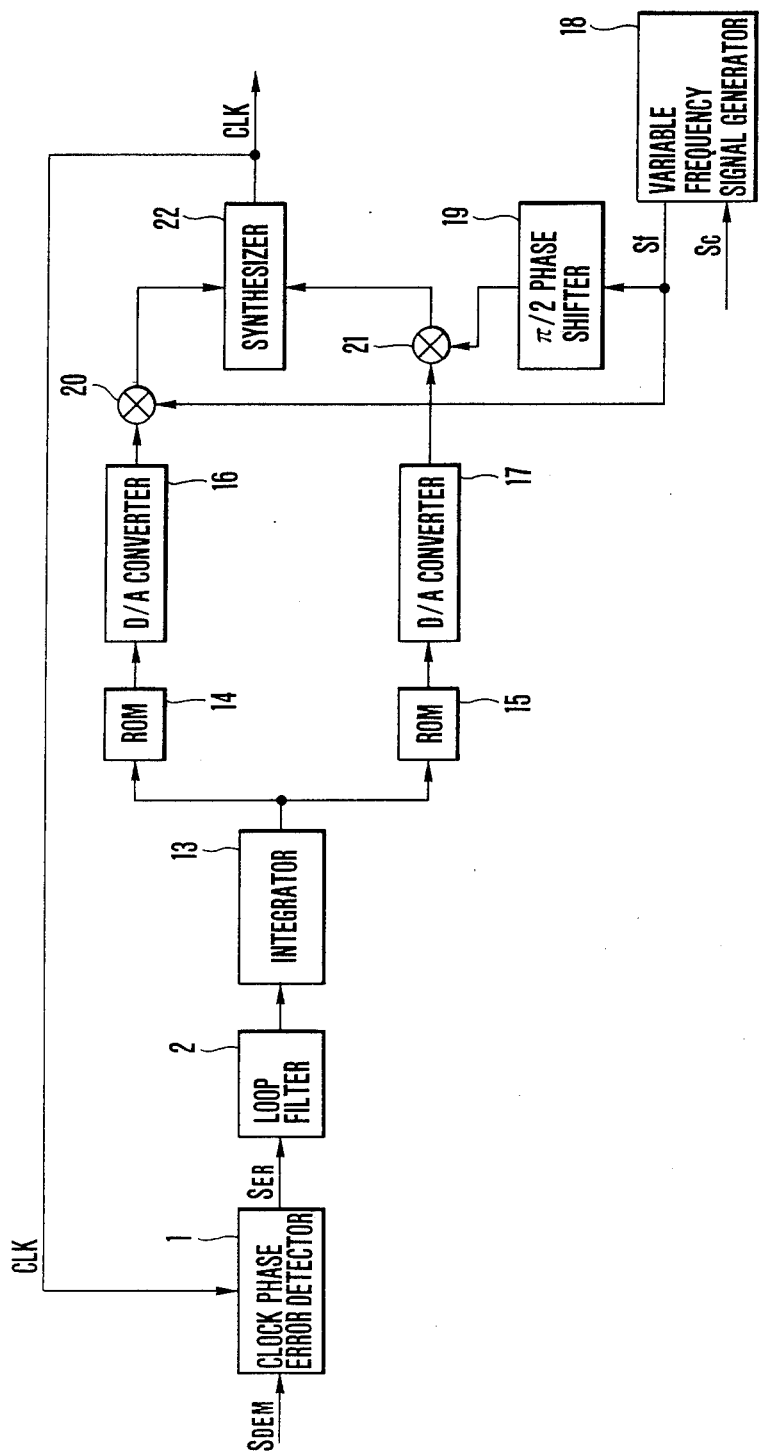
FIG. 3 is a block diagram showing an embodiment of the present invention.

FIG. 3 shows a variable bit rate clock recovery circuit according to the embodiment of the present invention.

Figure 1:
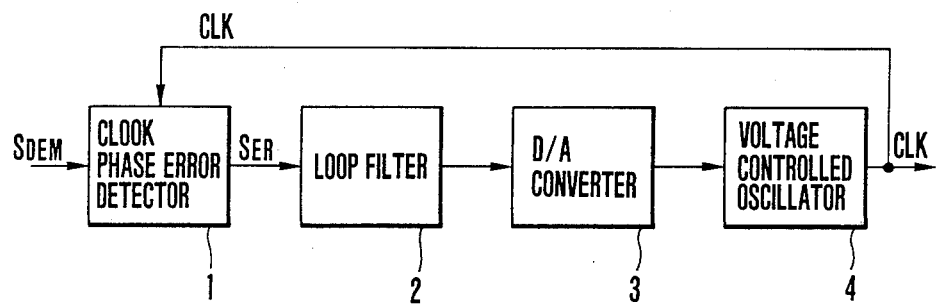
FIGS. 1 and 2 are block diagrams showing a prior art.
Figure 2:
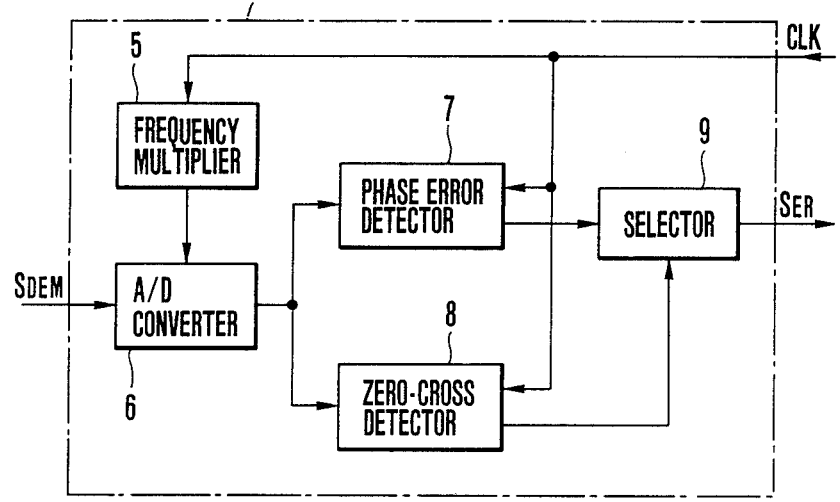

Referring to FIG. 3, a clock phase error detector 1 may employ the arrangement shown in FIG. 2. The clock phase error detector 1 receives a demodulated signal $S_{DEM}$ and a reference clock signal CLK, and outputs a clock phase error signal $S_{ER}$ having a value proportional to a phase difference between the signals $S_{DEM}$ and CLK. The detected clock phase error signal $S_{ER}$ is input to a loop filter 2. The loop filter 2 removes high-frequency components such as noise from the signal $S_{ER}$.

The loop filter 2 has low-pass filter characteristics which is an important factor determining a noise bandwidth, synchronization characteristics, and response characteristics of the loop. A type and constant of the filter are selected in accordance with a required performance of the loop. In addition, a primary type loop can be formed by simply replacing the loop filter 2 with multiplication of DC gain K. An output signal from the loop filter 2 is supplied to an integrator 13 and is integrated therein.

Figure 4:
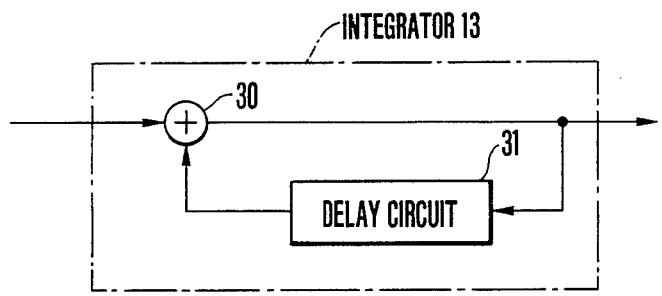
FIG. 4 is a circuit diagram showing part of the embodiment in FIG. 3.

As shown in FIG. 4, the integrator 4 can be easily realized by an adder 30 and a delay circuit 31 for delaying an input sampled value by one sampling period. Outputs from the integrator 13 are respectively supplied as addresses to ROMs 14 and 15, which store data of cosine and sine waves in a digital form in advance. Output digital signals from the ROMs 14 and 15 are respectively converted into analog signals by D/A converters 16 and 17.

A variable frequency signal generator 18 generates signals $S_f$ having various frequencies in accordance with external frequency control signals $S_c$. The output signal $S_f$ from the variable frequency signal generator 18 is supplied to a multiplier 20 and a $\pi/2$ phase shifter 19. The multiplier 20 multiplies the output signal from the D/A converter 16 by the output signal $S_f$ from the variable frequency signal generator 18, and supplies the multiplication result to one input terminal of a synthesizer 22. The $\pi/2$ phase shifter 19 shifts the output signal $S_f$ from the variable frequency signal generator 18 by $\pi/2$ radians, and supplies it to a multiplier 21. The multiplier 21 multiplies the output signal from the D/A converter 17 by the output signal from the $\pi/2$ phase shifter, and supplies the multiplication result to the other input terminal of the synthesizer 22.

The synthesizer 22 adds the input signals to its respective input terminals together, and outputs the addition result as the reference clock signal CLK upon SSB (signal sideband) modulation.

An SSB-modulating operation will be described below. The outputs from the D/A converters 16 and 17 are represented by the following equations (1) and (2), respectively:

$$V_c(t) = \cos(\Delta\omega t + \phi_o) \quad (1)$$

$$V_s(t) = \sin(\Delta\omega t + \phi_o) \quad (2)$$

where $\Delta\omega$ and $\phi_o$ are a frequency error and an initial phase error between the reference clock signal CLK and the output signal from the variable frequency signal generator 18, respectively, in a normal state of the loop.

The outputs from the variable frequency signal generator 18 and the $\pi/2$ phase shifter 19 are represented by the following equations (3) and (4), respectively:

$$v_c(t) = \cos \omega_c t \quad (3)$$

$$v_s(t) = \sin \omega_c t \quad (4)$$

Therefore, the SSB-modulated output obtained by the synthesizer 22 can be given by:

$$\begin{aligned} V_o(t) &= V_c(t)v_c(t) + V_s(t)v_s(t) \\ &= \cos\{(\omega_c - \Delta\omega)t - \phi_o\} \end{aligned} \quad (5)$$

and hence the reference clock signal CLK is obtained.

Figure 5:
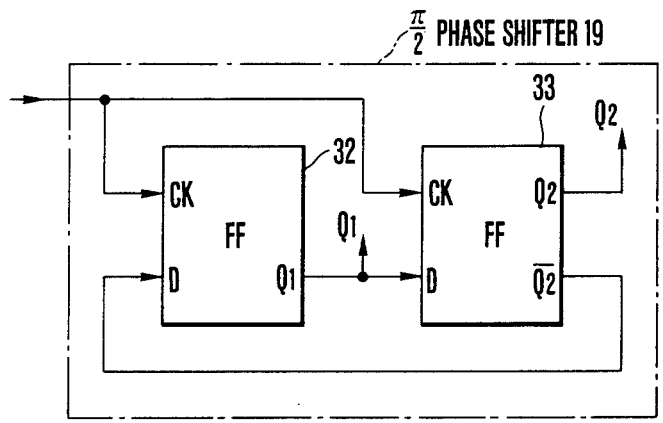
FIG. 5 is a circuit diagram showing another part of the embodiment in FIG. 3.
Figure 6:
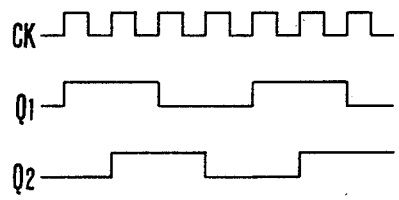
FIG. 6 is a timing chart for explaining an operation of the circuit in FIG. 5.

In this case, if the output from the variable frequency signal generator 18 is a square wave, the $\pi/2$ phase shifter 19 can be realized by using a simple digital circuit. FIG. 5 shows an arrangement of such a circuit. More specifically, a ring counter is constituted by two D flip-flops 32 and 33 so that a clock signal is frequency-divided at a ratio of ¼ to obtain a clock signal $Q_1$ and a clock signal $Q_2$ delayed by $\pi/2$ radians, as shown in FIG. 6.

Figure 7:
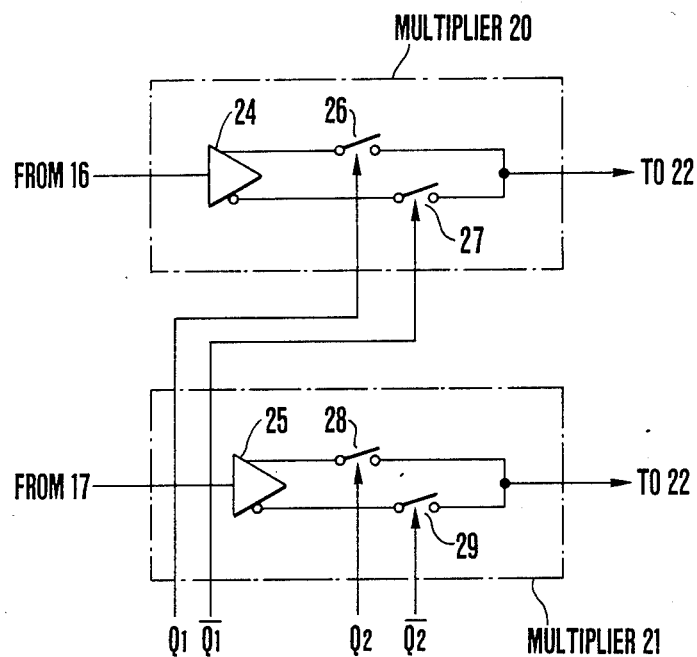
FIG. 7 is a circuit diagram showing still another part of the embodiment of in FIG. 3.

FIG. 7 is a circuit diagram showing the multipliers 20 and 21 according to the embodiment.

Referring to FIG. 7, the multiplier 20 comprises a differential converter 24 for differentially converting an output from the D/A converter 16, and switches 26 and 27 respectively connected to the inverted and noninverted signal output terminals of the differential converter 24. The switches 26 and 27 are respectively ON-/OFF-controlled by the output signals $Q_1$ and $\overline{Q}_1$ from the variable frequency signal generator 18. The multiplier 21 comprises a differential converter 17 for differentially converting an output from the D/A converter 17, and switches 28 and 29 respectively connected to the inverted and noninverted signal output terminals of the differential converter 25. The switches 28 and 29 are respectively ON/OFF-controlled by the output signals $Q_2$ and $\overline{Q}_2$ from the $\pi/2$ phase shifter 19.

Figure 8:
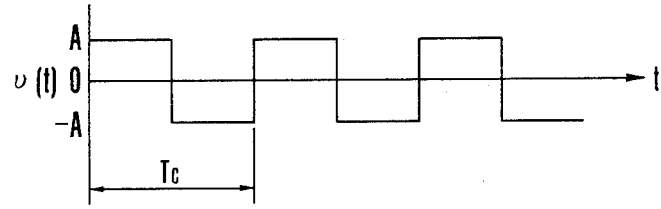
FIG. 8 is a timing chart for explaining an operation of the circuit in FIG. 7.

A square wave having a frequency $\omega_c(=2/T_c)$ shown in FIG. 8 is considered as an output signal from the variable frequency signal generator 18 or the $\pi/2$ phase shifter 19. If this wave is represented by V(t), it is apparent that the wave V(t) includes a sine wave of the frequency $\omega_c$ as a fundamental wave component. Assuming that an output from the D/A converter 16 or 17 is V(t), then an output $V_o(t)$ from the multiplier 21 or 22 is given by:

$$V_o(t) = V(t)v(t) \quad (6)$$

$$= \begin{cases} AV(t) & (n-1)T_c \leq t < \frac{2n-1}{2} T_c \\ -AV(t) & \frac{2n-1}{2} T_c \leq t < nT_c \end{cases}$$

where $n = 1, 2, \ldots$.

The outputs from the D/A converters 16 and 17 are respectively converted by the differential converters 24 and 25 into in-phase and opposite-phase signals. The switch 26 or 28 is closed during an interval of an amplitude A in the waveform shown in FIG. 8 to output the in-phase signal. At the same time, the switch 27 or 29 is opened to inhibit the opposite-phase signal. The switch 26 or 28 is opened during an interval of an amplitude $-A$ to inhibit the in-phase signal. At the same time, the switch 27 or 29 is closed to output the opposite-phase signal.

As has been described above, according to the present invention, a clock phase error signal detected by the clock phase error detector is filtered by the loop filter, and is then integrated. The frequency and phase of an output signal from the variable frequency signal generator are controlled by the ROM, the D/A converter, the multiplier, the $\pi/2$ phase shifter, and the synthesizer using the integrated output, thereby outputting a reference clock signal. With this arrangement, the following effects can be obtained.

(1) Replacement of a VCO, modification of a circuit, and cumbersome adjustment, which are performed every time a modulated data bit rate is changed, are not required at all. Therefore, a single circuit can respond to all the modulated data bit rates.

(2) Since a VCO is not used, problems such as nonlinearity of the frequency modulation sensitivity of the VCO and drift of an oscillation frequency due to temperature change and deterioration over time can be prevented.

(3) Since a digital shifter using a ROM is employed, accurate phase shift can be performed.

(4) Since SSB modulation is utilized, image components of a reference clock signal are canceled. Therefore, a filter for removing unnecessary waves need not be inserted in the output stage.

What is claimed is:

1. A variable bit rate clock recovery circuit comprising:
   a clock phase error detector for receiving a demodulated signal of a digitally modulated signal and a reference clock signal, detecting a phase error between the input signals, and outputting a clock phase error signal;
   a loop filter for removing a high-frequency component from the clock phase error signal;
   an integrator for integrating an output signal from said loop filter;
   first and second ROMs for storing data of cosine and sine waves in a digital form in advance, said first and second ROMs being accessed by an output from said integrator;
   first and second D/A converters for respectively converting output digital signals from said first and second ROMs into analog signals;
   a variable frequency signal generator, controlled by a frequency control signal, for generating signals having various frequencies;
   a phase shifter for shifting a phase of each signal from said variable frequency signal generator by $\pi/2$ radians;
   a first multiplier for modulating each output from said variable frequency signal generator by using an output signal from said first D/A converter;
   a second multiplier for modulating an output from said phase shifter by using an output signal from said second D/A converter; and
   a synthesizer for adding outputs from said first and second multipliers together and outputting the reference clock signal.

2. A circuit according to claim 1, wherein each of said first and second multipliers comprises a differential converter, and a switch ON/OFF-controlled by square output signals from said variable frequency signal generator and said $\pi/2$ phase shifter.

* * * * *